United States Patent [19]

Morrell

[11] Patent Number: 4,742,483
[45] Date of Patent: May 3, 1988

[54] LASER PRINTER MAINTENANCE SYSTEM
[75] Inventor: Brian R. Morrell, Randolph, Mass.
[73] Assignee: Minolta Camera Company, Ltd., Osaka, Japan
[21] Appl. No.: 733,943
[22] Filed: May 14, 1985
[51] Int. Cl.[4] .................. G06F 15/16; G06F 11/00; G03G 15/00
[52] U.S. Cl. ................... 364/900; 355/14 R; 371/15
[58] Field of Search ... 364/200 MS File, 900 MS File, 364/518, 519, 523; 355/14; 371/15

[56] References Cited

U.S. PATENT DOCUMENTS

4,188,668  2/1980  Finlay .................. 364/900

Primary Examiner—Raulfe B. Zache
Attorney, Agent, or Firm—Weingarten, Schurgin, Gagnebin & Hayes

[57] ABSTRACT

A laser printer receiving font data and program data through removable font cartridges, which permit the user to interchange the particular font style as desired, and allows the servicing of the system by a separate maintenance program which is downloaded from the font cartridge. The laser printer sytstem includes a microprocessor which reads a particular address on the font cartridge to indicate whether the information stored thereon is font data or program information. If the information on the cartridge is a program, a subsequent font cartridge address location indicates whether an operating system or a maintenance program is resident thereon and is to be downloaded into the microprocessor system. Upon loading of such maintenance program, the maintenance operator may individually select a specific test according to a sequence of interactive system prompts. The maintenance tests include manipulation of the mechanical elements and cycling of associated printer components, together with testing of electronic components incorporated in the system. The condition ascertained by the tests is reported on the front panel by error codes, and the system may be again placed into normal operation by cycling the power, wherein the font data is available through the same port which had previously received the maintenance program. The resulting laser printer provides a flexible and simplified operation and maintenance of a complex electronic and mechanical printer system with a minimum of user familiarity with internal system operations.

12 Claims, 6 Drawing Sheets

FIG. 6

LASER PRINTER MAINTENANCE SYSTEM

FIELD OF THE INVENTION

This invention relates to system maintenance and more particularly to an automatic diagnostic and maintenance system for laser printers and similar equipment.

BACKGROUND OF THE INVENTION

Laser printers are employed as computer printers and provide high speed, high quality printing of text and graphics. These printers include complex and sophisticated electro-optical, electro-mechanical and electronic assemblies which must be maintained in precise working order in order for the printer to perform appropriately. The printer is usually employed within an office or other setting and is used by personnel who are not usually capable of technical maintenance of the apparatus. Service personnel who attend to maintenance of the apparatus would have to possess a relatively high level of skill to diagnose and maintain the printer if such diagnosis and maintenance activities were to be performed on a manual basis. The complexity of the apparatus and the level of skill required for proper diagnosis and maintenance is sufficiently high as to make maintenance on a manual basis unrealistic for such apparatus which is expected to function as a piece of office equipment, and which is expected to be functional on a day to day basis. Automatic test systems are known for office equipment such as copiers and computers, however these systems usually provide only a limited number of tests to denote overall operability and do not provide the means for exercising each critical assembly for possible defect. Known autotest systems also usually function in accordance with a fixed routine which cannot be altered or varied by the service personnel, and which often does not provide a sufficient or variable number of tests which would be useful to appropriately monitor the operability of the equipment.

SUMMARY OF THE INVENTION

The present invention provides a system for the automatic diagnosis and maintenance of all assemblies of a laser printer or similar equipment and which utilizes the standard operating controls and indicators of the printer for the testing routines. The novel system is extremely flexible in permitting service personnel to select particular tests to be performed or repeated, or to ignore certain tests during a particular routine. The normal operating system resident in the printer controller is supplanted during a maintenance run by a maintenance operating system entered into the controller, preferably by downloading from a firmware cartridge which can be loaded into an available slot of the controller. In preferred operation, when the printer is powered on with a maintenance cartridge present in the font slot of the printer, the special maintenance operating system is identified and downloaded into the controller random access memory, and this special operating system supersedes the normal printer operating system for performing the automatic maintenance routines. Each test of the maintenance routine can run continuously until halted by the operator.

BRIEF DESCRIPTION OF THE DRAWING

These and other features of the present invention will be better understood by reading the following detailed description, together with the drawing, wherein.

DETAILED DESCRIPTION OF THE INVENTION

Figure 1:
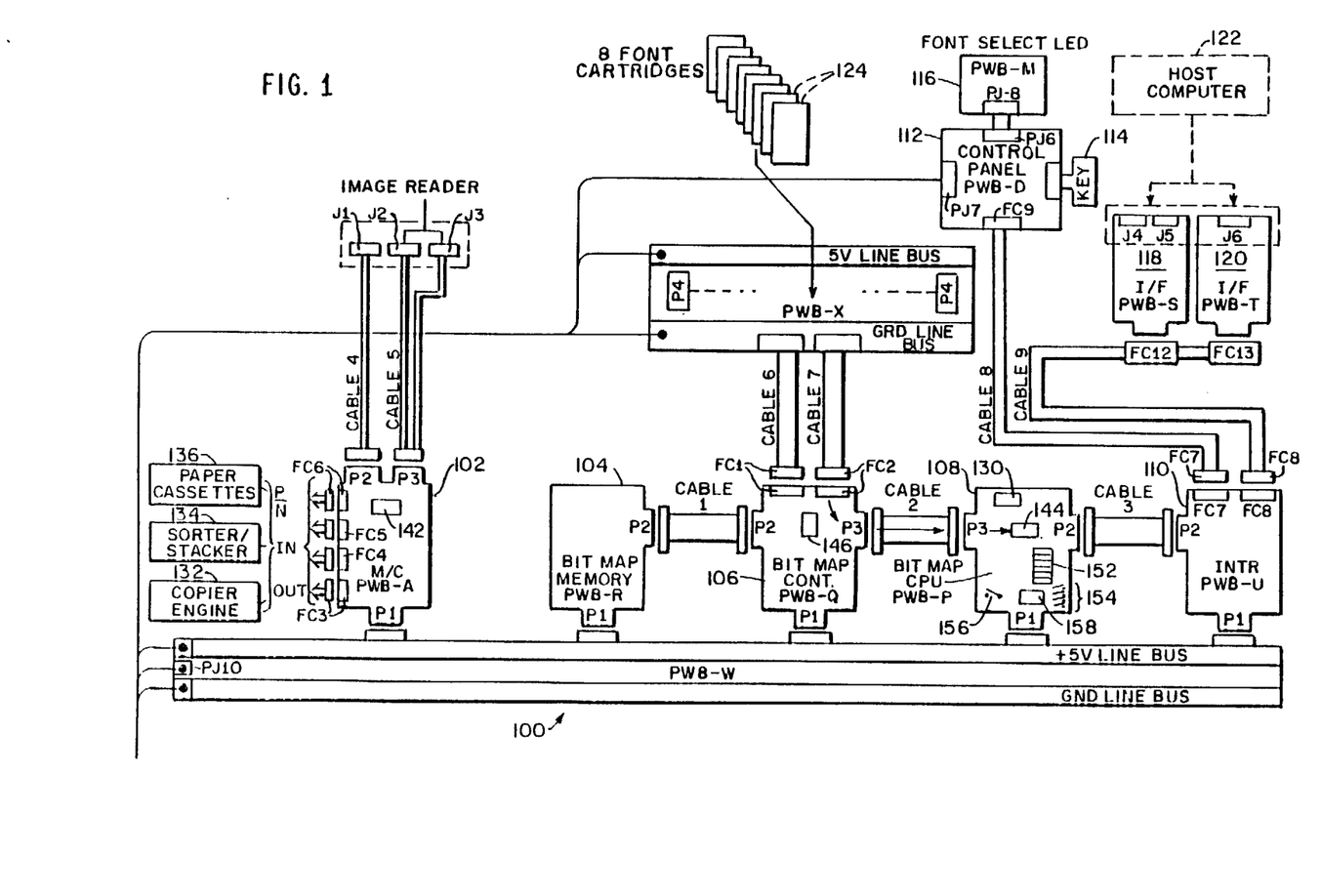
FIG. 1 is a block diagram of the system.

A block diagram 100 of the system according to the present invention is shown in FIG. 1, comprising a plurality of circuit cards embodying the subsystems of the present invention. Although the system 100 has three microprocessors 142, 144, and 146, it is essentially controlled by the bitmap CPU board microprocessor 144. The memory area 130 of the bitmap CPU board 108 also shown in the memory map of FIG. 3 contains 64K bytes of random access memory (RAM) 302 of FIG. 3 in the form of eight 264K-bit dynamic RAM chips which communicate with microprocessor 144 and 146. However, not all of RAM is available for use by programs. The upper 256 bytes (hexadecimal FF00-FFFF) of memory space 302 are mapped to a "common RAM" block for communication with the processor of the copier engine controller 142. The upper limit of the normally available program RAM is therefore location FEFF. The "common RAM" area of memory is actually a scratchpad memory located on the copier engine controller board, having an available interface to all processors in the system, of which there are currently two active: the copier engine controller 142 itself and the bitmap CPU 144. The location FF00 has particular significance to the copier engine controller, in that writing to this memory address causes a hardware interrupt to occur on the copier engine controller board 102.

Figure 3:
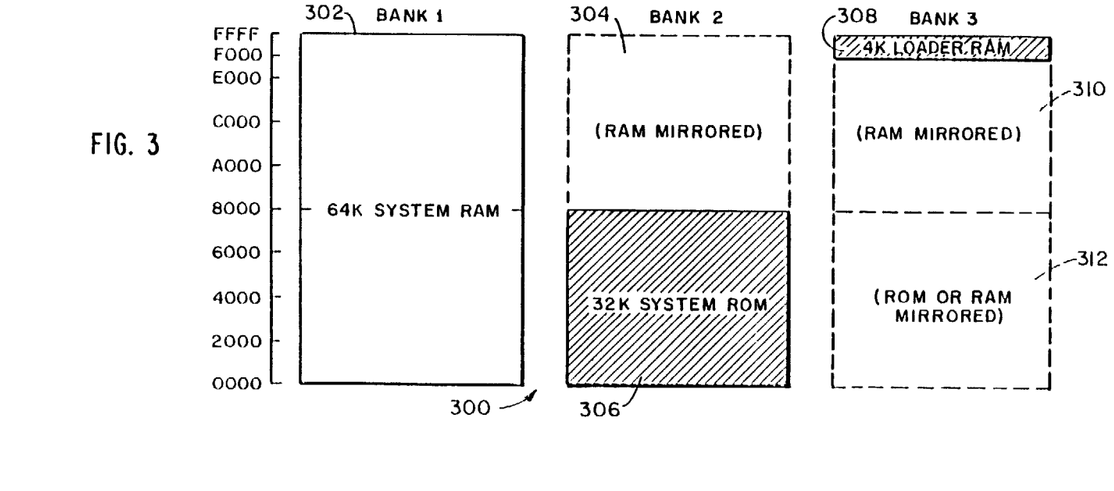
FIG. 3 is a memory map of the shared memory area of the system of FIG. 1.

The software resides on read-only memory (ROM) 306 of FIG. 3 or progammable read-only memory (PROM) chips 152 which are read by microprocessor 144. A set of four switches 154, also read by microprocessor 144, are provided for the purposes of defining the boundary between ROM and RAM, by bank switching RAM over the existing ROM (see FIG. 3). At any given time, the state of the four switches defines the high-order bits of the lowest RAM address. Consequently, when the switches are all set "off," the location 0000 is defined to be RAM and removes all ROM from use. When only the lowest switch is set "on," the lowest 4K of ROM is enabled. The amount of RAM may be varied from 64K downward to 32K in 4K increments. Software is capable of overriding the switch positions and resetting the ROM/RAM boundary, as will be described further below.

According to the present invention, the CPU board 108 will accept downline loading of software from a font cartridge 124. For this purpose, the bitmap CPU 144 on board 108 alters the address base on a system reset. Another switch 156 on the bitmap CPU board 108 causes the system reset to map in a special loader ROM 158. Immediately upon system reset, this loader ROM 308 of FIG. 3 is mapped to address 0000 in order that a JMP instruction (always found in the first three bytes of ROM) may be executed to jump to an address at or above F003 and below FEFE. When the processor is executing this JMP instruction, the loader ROM is remapped to addresses F000 through FEFF, so the processor can JMP to the loader program. After the JMP instruction is executed, addresses 0000 through EFFF are mapped in as RAM, regardless of the setting of the boundary switches. This makes it possible for the loader program to write the system software from a font cartridge into low bitmap CPU memory 130.

A special port is provided to allow the software to set its own boundary values (I/O port 40). This assignment of boundary values is generally done by the system software after it has been loaded and started. This port is defined as a write-only port with its low 4 bits being the boundary address, corresponding to the four switches described above. Upon system reset, these bits are cleared so that if the load switch is set to ignore the boundary switches and execute the loader program, the low memory will all be RAM after the initial JMP instruction is executed. Bit 7 controls the mapping of the loader ROM itself. When the load switch is set, this bit is automatically reset to zero by the system reset, which also maps in the loader ROM. Should the software require the removal of the ROM (thus mapping RAM at F000), the bit is set to 1. This action can be performed simultaneously with the setting of the rest of the port bits. By setting this bit back to zero, the software is able to map and reexecute the loader program, after having remapped the low RAM.

To facilitate the operation of the loader ROM, each program to be loaded has its total size in bytes associated and linked at location 000E. Since all programs start at zero by convention, this location contains a pointer to the first unused byte in memory. When 0FFF is added to this number, the four high-order bits determine the number of 4K-byte "pages" needed for the program, which is then the varying number to be moved into the low 4 bits of the port, described above. Furthermore, system software also has the ability to enable and/or disable the boundary switches; although the down-loaded operating system would have very little reason to do this, a ROM-based operating system might need to move its own boundary up or down. Bit 6 can therefore be reset to zero to enable the four low-order bits of this port, or set to 1 to enable the switches on the bitmap CPU board. If the load switch is set, bit 6 is reset to zero by the system reset and the boundary switches are ignored.

All activity regarding fonts is performed from the bitmap CPU by accessing various port-mapped registers on the bitmap controller board 106. For example, any of eight fonts is selected by writing an encoded value to the bitmap font select register through port 67. Two font address registers allow the bitmap CPU to select a starting address within a font for subsequent read or write operations. The font read (input only) and font write (output only) registers are used for actual data transfer, while the command register is used to instruct the bitmap controller of the function to be performed.

A font, as seen by the bitmap controller, is a collection of data containing a directory and a number of blocks of pixel data representing characters. Each font comprises two complete sets of font data, one for portrait and one for landscape-oriented characters. Physically, each font is stored within a font cartridge on one or more ROM or PROM chips, or in some cases the equivalent amount of static RAM, and is addressed by the bitmap controller as a continguous block of memory. A font may have as much as 64K bytes of data in each orientation. Its addressing is therefore quite like that of typical processor memory addressing. The software accesses the fonts through the bitmap controller interface, as previously described, using a 16-bit address and obtaining 8-bit data.

The first byte of data in every font (at font address 0000) is a unique font ID code, (e.g., 23 hex). The ID code C3 is reserved for operating systems which may be resident in a font cartridge. The ROMs containing an operating system in a font cartridge are identical to the ROMs for the same system as they would exist installed into the bitmap CPU board. Since the first instruction in every operating system, as mentioned above, is a JMP instruction whose machine code is C3, the bitmap CPU is guaranteed of finding a font-resident operating system simply by reading the first byte of data in each font. A "revision ID" code at location 0022 indicates whether the program just loaded is a normal operating system or a maintenance program. Once the loader program has located a system, it can then proceed to transfer one byte at a time from the font cartridge to auto start loading into system RAM (also beginning at address 0000). Once the complete operating system has been downline loaded in this manner, the loader program simply transfers control to the now-resident system by executing a JMP to a predetermined address in low RAM where the system is expecting to begin its normal execution. If the operating system has been loaded, one of the first operations performed by the operating system is to disable the loader ROM by writing to port 40, as described above, making RAM available from addresses F000 through FEFF.

The maintenance system is an independent operating system which resides in a special font cartridge and is downloadable into the system. An extensive set of tests, designed for use by field service technicians, comprises the maintenance system. There are nine test groups, most of which consist of a number of individual tests. Throughout this document, the individual tests will be referred to as items, and the test groups will be referred to as tests.

TABLE 1

| Test No. | Test |
| --- | --- |
| 1 | Common RAM Test |
| 2 | Bitmap Memory Tests |
| 3 | Copier Engine Sensor Tests |
| 4 | Copier Engine Component Tests |
| 5 | M/C DIP Switch Check |
| 6 | Copier Engine Heater Control Tests |
| 7 | Laser Function Tests |
| 8 | Copier Engine Warmup Cycle |
| 9 | RS232 Interface Tests |

The maintenance system is intended to be run only by downloading it from a font cartridge. It will not function if it is inserted directly into the bitmap CPU board. It is further intended that the maintenance system should download regardless of the position of the system download switch on the bitmap CPU board.

Figure 2:
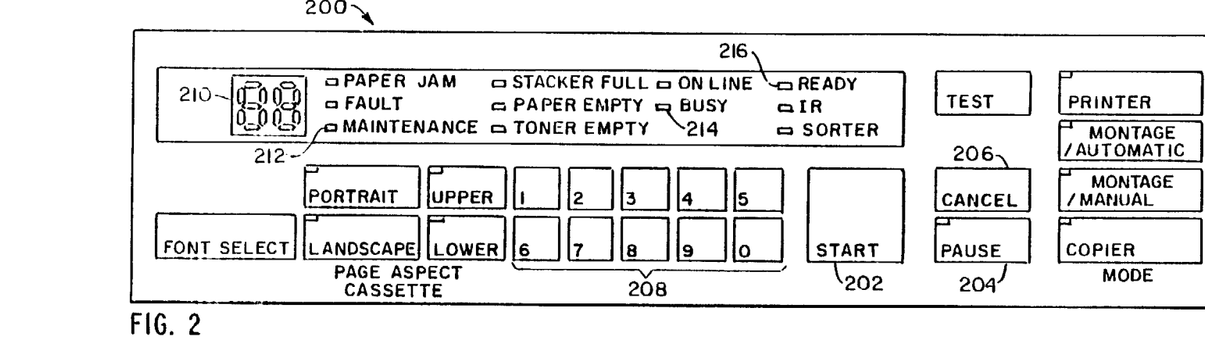
FIG. 2 is a drawing showing the control panel of the system of FIG. 1.

The front panel of the system according to the present invention, shown in FIG. 2, serves as the technician's input/output device, through which each of the tests can be selected and test results read. The only buttons that are necessary in the maintenance system are the "start" and "cancel" buttons, for starting and stopping tests, and the 10-digit keypad, for selecting the tests and items to be run. Any other buttons pressed, or a normally legal button pressed at the wrong time, will have no effect other than causing the buzzer to beep. Optionally, a terminal may be connected to the RS232 port of the printer for operator input/output.

When the maintenance system is loaded, the "maintenance" light 212 will come on, followed by the "ready" light. If the "ready" light should not come on, this is an indication that communications between the bitmap CPU and the M/C are not functioning.

To proceed with the testing, the operator must press "start" to begin maintenance system operation. This allows the operator to examine the LEDs for any error codes which may have appeared during the loader program's power-on diagnostics. Once the "start" button has been pressed, the ready light 216 will come on, and a "d" will be displayed in the LEDs. This "d" is the operator's prompt to select a test, using the keypad 208. When a test is selected, its single-digit number will replace the "d" prompt in the left LED.

If additional input is required, as is the case with many of the tests which have a set of associated test items, an "A" will appear in the right LED. This is a prompt for the operator to select a one- or two-digit item from the keypad. If an illegal value is chosen for either a test or item, the buzzer on the front panel will sound and the "d" prompt will reappear in the LEDs.

Items can be one or two digits in length. Therefore, the first keypad button that is pressed when selecting an item will cause that number to appear in the right LED digit, with the left LED digit going blank. If a second keypad digit is pressed, the contents of the right LED digit will appear in the left LED digit and the new number will appear in the right LED digit. This functions in the same manner as a calculator's display.

Once the above steps have been taken, the "start" button must be pressed before the test will begin running. The exception to this is test 8, which begins running immediately when it is selected. When a test starts to run, the "ready" light will go out and the "busy" light will come on.

At any time during the running of a test, or during the test selection process, the "cancel" button may be pressed. Using the "cancel" button is the only method for halting execution of a test once it has started to run. When the "cancel" button has been pressed, the LEDs will display the most recent prompt: if no items are associated with the test that was just running, then the "d" prompt will return; otherwise the last-selected test number and the "A" prompt will be displayed. In the latter case, pressing "cancel" a second time will exit from the test group and return to the "d" prompt.

Figure 4:
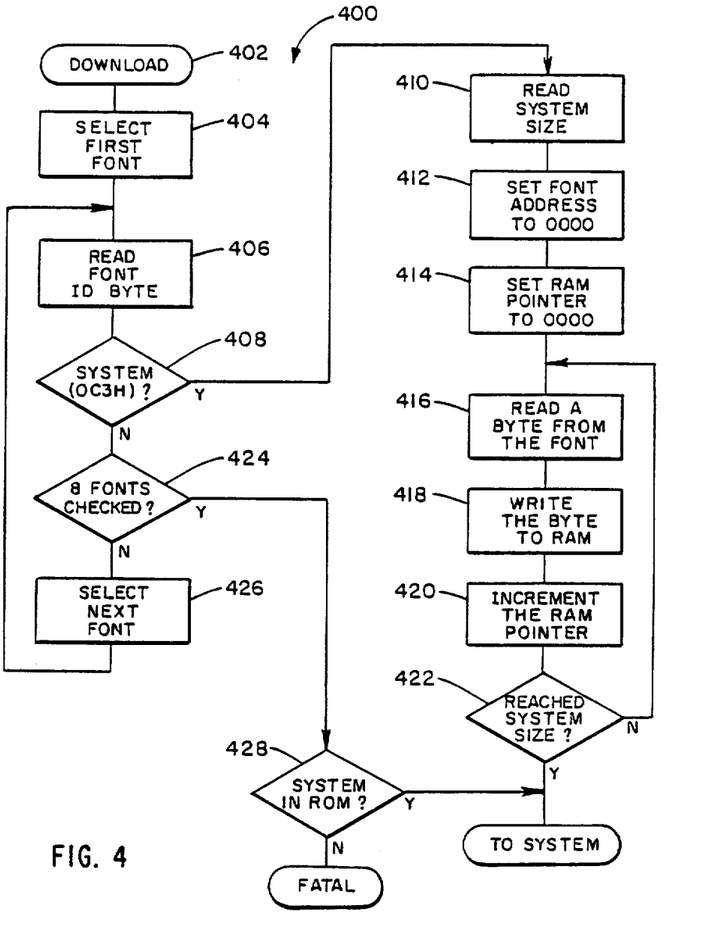
FIG. 4 is a flowchart showing software downloading from a font cartridge.

Referring now to FIG. 4, the flowchart 400 describes the downloading of maintenance and operating systems from the font cartridge. When the downloading process is begun at 402, the system selects the first font address at 404, where it is read to recover an identification byte at 406. If the byte is a program as opposed to a font cartridge, the program is identified by a data code at 408. If the data in the font cartridge to be downloaded is a program, the system size is read from the font cartridge at 410, and the font address is set to zero at 412. Next the random access pointer is set to location zero at 414, and a byte is read from the font cartridge at 416. The data read is written to the RAM at 418, and the RAM pointer is incremented at 420. The size of the system is tested at 422, and the next byte is read if the system has not reached the maximum size determined in step 410, and the process is restarted beginning with step 416. If the system size has been achieved, the subroutine returns to start the operation of the system just loaded. If the font cartridge data does not have a program identification at 408, it is assumed that the contents of the cartridges are fonts, and the data is checked against the eight fonts which are used in thes system. If the data fails the font test at 424, the next font is selected at 426 and read at 406, the process continuing thereafter. If the system test at 424 is positive, the presence of the system in ROM is tested. If the system already exists in the ROM, the subroutine 400 returns to invoke the operating or maintenance system in the ROM. If the system is not in ROM at test 428, the system notes a fatal error and returns the indication of an error condition for appropriate operator diagnostic response.

Figure 5:
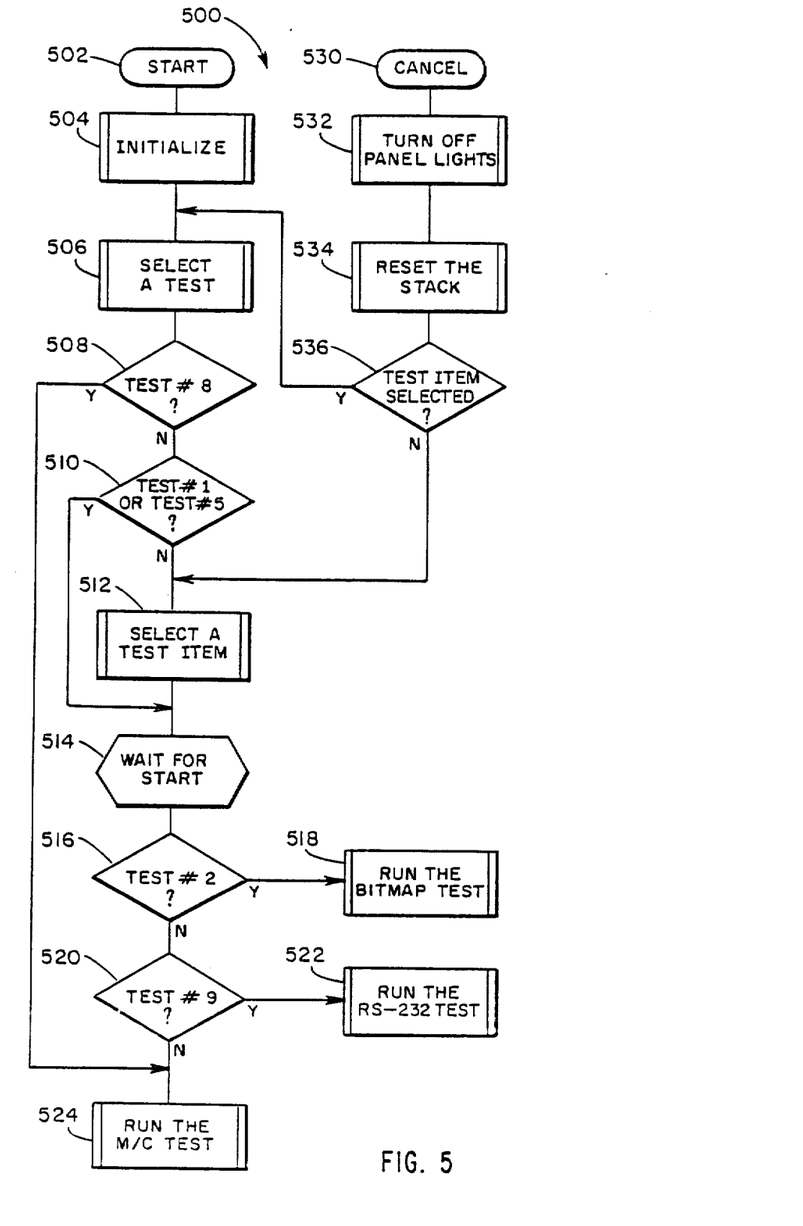
FIGS. 5 and 6 are flowcharts showing maintenance system operations.
Figure 6:
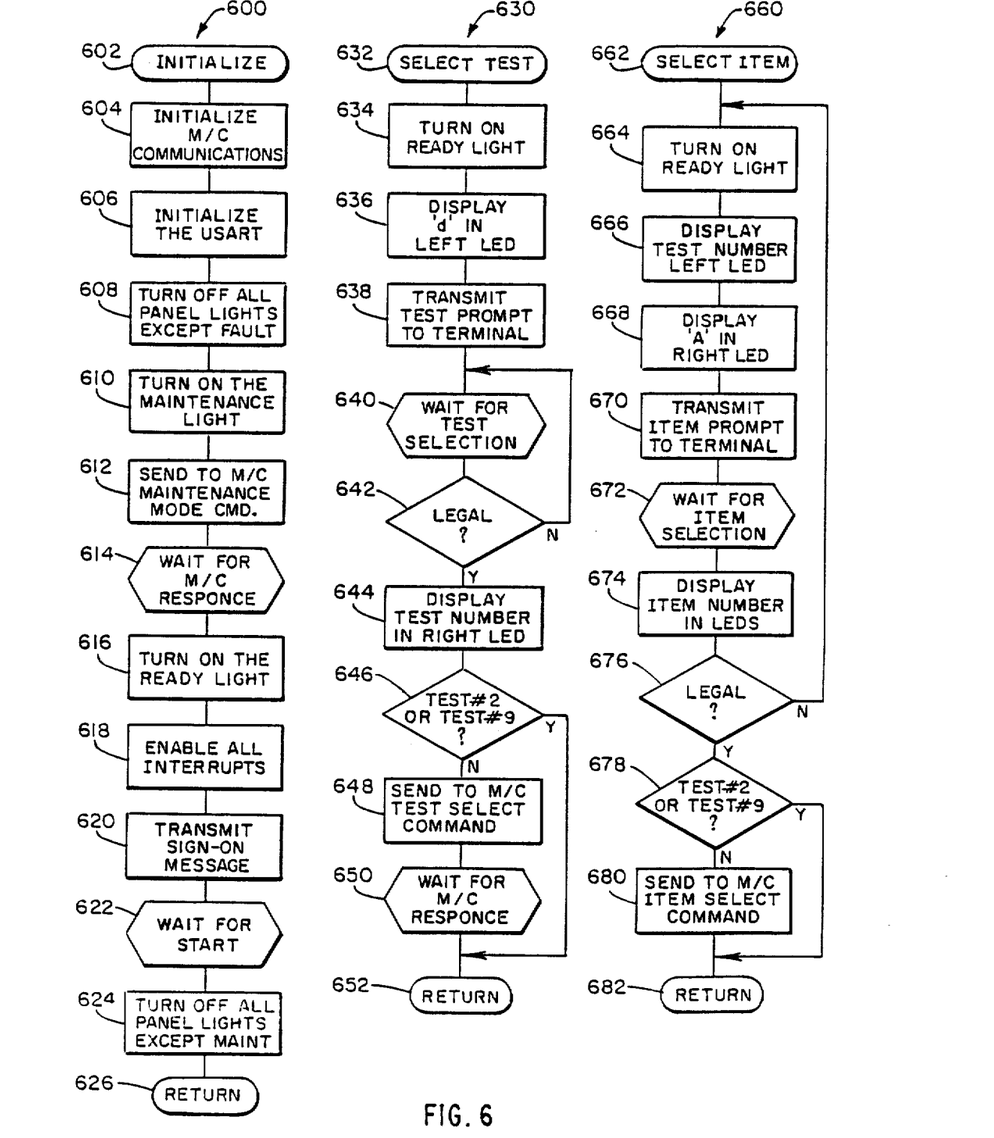

The overall maintenance in diagnostic operation is shown in flowchart 500 of FIG. 5, wherein the tests listed in Table 1 are selected and performed. The process is begun at 502, and the initialization process 504, discussed in detail in FIG. 6, is performed. Next the test is selected at 506, also discussed in detail in FIG. 6. The maintenance procedure determines if Test No. 8 is selected at 508. If Test No. 8 has been selected, the test is run at 524. If Test No. 8 has not been selected, the system determines if either Test No. 1 or Test No. 5 has been selected at 510. If the enumerated test has been selected, the process waits for a start signal at 514. Upon receiving the start signal, the system determines whether Test No. 2 has been selected at 516, and provides the test if selected at 518. If Test No. 2 has not been selected, the system then determines if Test No. 9 has been selected at 520, wherein if selected, the test is provided at 522. The test sequence may also be cancelled by a process begun at 530, wherein the panel lights are turned off at step 532, and the microprocssor stack is reset at 534. The maintenance system is activated when the printer is powered up, with the maintenance firmware inserted in a font slot. The cancel function is interrupt-generated, primarily for use in ending a running test, since all of the tests run continuously until halted by the operator. Cancel may also be used during test selection, to reenter incorrectly selected test numbers. The wait function sits in a tight loop until an interrupt comes in, at which time it returns to the caller a bit definition of the interrupting device. Next the selection of the test item again determined at 536 and initiated at step 506 if provided. If the test item is not selected, the process begins at 512, and continues to step 514 waiting for a start signal.

The initialization subroutine 600 in FIG. 6 is begun at step 602, and the communications protocol initialized at step 604. The universal synchronous/asynchronous receiver transmitter (USART) is initialized at step 606, and all panel lights except that fault light are turned off at step 608. The maintenance light is turned on at 610, and a maintenance mode command is sent at step 612. The system then waits for a response at step 614, upon receipt of which a "ready" light is turned on at step 616. Thereafter, all interrupts are enabled at step 618, and a sign-on message is transmitted at 620. The system thereafter waits for a start signal at step 622, and extinguishes all panel lights except the maintenance light at step 624. The select test subroutine 630 is shown in FIG. 6 and begun at step 632, and the "ready" light is turned on at step 634. A "d" is display in the left LED at step 636, and test prompt signal is sent to the terminal connected to the system at step 638. The system waits for a test selection at step 640, and verified for a legal condition at step 642. If the condition is illegal, the system again returns to the wait mode at step 640. If the signal is acceptable, the test number is displayed in the right LED at step 644. The system determines if either Test No. 2 or No. 9 is selected at step 646, and returns to the calling program if the Test No. 2 or No. 9 is selected. If neither Test No. 2 nor No. 9 is selected, the test select command is generated at step 648. The system then waits for a response at step 650, returning to the calling subroutine upon receipt of the response at step 652. The select item subroutine 660 is shown in FIG. 6, and begun at step 662. The "ready" light is turned on at step 664, and the test number is displayed on the left LED at step 666. The right LED displays an "A" at step 668, and an item prompt is transmitted to the attached terminal at 670. The system waits for an item selection signal at step 672, and displays the item selected in the LEDs at step 674.

The item number is evaluated for illegal condition at step 676, and again evaluated for a Test No. 2 or No. 9 condition at step 678. If Test No. 2 or No. 9 is invoked, the system subroutine returns to the calling program at step 682. If the code is illegal at step 676, the process begins again at step 664 and continues as previously discussed. If the test selected is neither No. 2 nor No. 9 at step 678, the item select command is sent at step 680.

Modifications and substitutions made by one skilled in the art are considered to be within the scope of the present invention, which is not to be limited except by the claims which follow.

What is claimed is:

1. A multiprocessor controlled laser printer comprising:
   a printer engine for providing laser printed outputs;
   modular memory means which include at least one of font data and program data, said program data comprises at least one of an operating system program and a maintenance program, and further including data for identifying said data corresponding to the font data, operating system program data and maintenance program data, respectively;
   a bitmap memory;
   a printer engine controller processor, which is connected to said printer engine, for controlling said printer engine in accordance with the data included in said modular memory means;
   a controller processor, which is connected to said modular memory means and said bitmap memory, for controlling said bitmap memory and for selectively reading said modular memory means;
   common random access memory connected to both said controller processor and said printer engine controller processor providing an exchange of data therebetween; and wherein
   said printer engine, said printer engine controller processor, said bitmap memory, and said controller processor for said bitmap memory are operative in response to said maintenance program.

2. The multiprocessor controlled laser printer of claim 1 wherein said controller processor for controlling said bitmap memory comprises:
   a bitmap controller; and
   a bitmap CPU; wherein said bitmap controller provides data transfer from said modular memory means to said bitmap CPU.

3. The multiprocessor controlled laser printer of claim 2, further comprising:
   a front panel connected to said bitmap CPU for selectively providing at least one of a normal operation control function and a maintenance operation function from said modular memory means.

4. The multiprocessor controlled laser printer of claim 3, wherein
   said front panel maintenance operation function includes a "start" button and a "cancel" button providing a corresponding instruction to said bitmap CPU according to said maintenance program.

5. The multiprocessor controlled laser printer of claim 4, wherein
   said front panel maintenance operation function includes keypad means for selecting maintenance tests and maintenance test items according to said maintenance program.

6. The multiprocessor controlled laser printer of claim 5, wherein said maintenance tests comprise:
   a Common RAM Test, a Bitmap Memory Test, a Copier Engine Sensor Test, a Copier Engine Component Test, an M/C DIP Switch Check, a Copier Engine Heater Control Test, a Laser Function Test, a Copier Engine Warmup Cycle, and an RS232 Interface Test.

7. The multiprocessor controlled laser printer of claim 5, wherein
   said front panel includes means for prompting a laser printer operator to select one of said maintenance tests and test items according to maintenance program.

8. The multiprocessor controlled laser printer of claim 7, wherein
   at least one of said "start" button, said "cancel" button and said keypad is operative to cause a program jump to a predetermined prompt upon a single depression and cause an end of test upon a multiple depression thereof.

9. The multiprocessor controlled laser printer of claim 5, wherein
   said front panel includes error indicator means providing an error indication according to said maintenance operation.

10. The multiprocessor controlled laser printer of claim 5, wherein
    said "start" andd said "cancel" buttons are used in concert to select a plurality of said test items providing a sequential maintenance test start of laser printer comonents then running simultaneously.

11. Laser printer comprising:
    a printer engine for providing laser printed outputs;
    font memory means, connected to the laser printer, for storing font data;
    first controlling means for printing images by controlling said printer engine in accordance with said font data and connected to said printer engine;
    diagnostic memory means, connected to the laser printer, for storing a diagnostic program;
    detecting means for detecting that said diagnostic memory means is connected to the laser printer; and
    second controlling means for diagnosing the laser printer in response to said diagnostic program when said detecting means detects attachment of said diagnostic memory means, and being connected to said laser printer and said detecting means.

12. A laser printer comprising:

a printer engine for providing laser printed outputs;

modular memory means, connected to the laser printer, for storing at least one of font data and maintenance program data, and further storing data for identifying said data corresponding to the font data and the maintenance program data, respectively;

means for identifying said modular means connected to the laser printer in accordance with said identifying data;

a first controller means, which is connected to said printer engine, for controlling said printer engine in response to the font data in said modular memory means;

a second controller means for diagnosing the laser printer in response to the maintenance program data when said identifying means identifies said modular means having the program maintenance data stored therein, and connected to said laser printer and said identifying means.

* * * * *

UNITED STATES PATENT AND TRADEMARK OFFICE
CERTIFICATE OF CORRECTION

PATENT NO. : 4,742,483
DATED : May 3, 1988
INVENTOR(S) : Brian R. Morrell

It is certified that error appears in the above-identified patent and that said Letters Patent is hereby corrected as shown below:

Column 3, lines 34-35, "associ-ated" should read --assembled--.

Column 6, line 10, "thes" should read --the--.

Column 6, line 39, "microprocssor" should read --microprocessor--.

Column 6, line 58, "that fault" should read --the fault--.

Column 8, lines 45-46, "mainte-nance operation." should read --mainte-nance program operation.--.

Column 8, line 49, "andd" should read --and--.

Column 8, line 52, "comonents" should read --components--.

Signed and Sealed this

Thirtieth Day of May, 1989

*Attest:*

*Attesting Officer*

DONALD J. QUIGG

*Commissioner of Patents and Trademarks*